United States Patent [19]
Small

[11] 3,821,966
[45] July 2, 1974

[54] CHECK-VALVE ASSEMBLY

[75] Inventor: Charles B. Small, Elyria, Ohio

[73] Assignee: Airborne Manufacturing Company, Lorain County, Ohio

[22] Filed: Mar. 15, 1973

[21] Appl. No.: 341,538

[52] U.S. Cl............................ 137/525.3, 137/527.2
[51] Int. Cl............................................. F16k 15/14
[58] Field of Search...................... 137/527.2, 525.3

[56] References Cited
UNITED STATES PATENTS
| | | | |
|---|---|---|---|
| 2,867,213 | 1/1959 | Thomas | 137/525.3 X |
| 3,292,658 | 12/1966 | Scaramucci | 137/527.2 X |
| 3,568,712 | 3/1971 | Rinehart | 137/525.3 |
| 3,628,565 | 12/1971 | McWethy | 137/525.3 |

FOREIGN PATENTS OR APPLICATIONS
| | | | |
|---|---|---|---|
| 1,000,199 | 1/1957 | Germany | 137/525.3 |

*Primary Examiner*—Robert G. Nilson
*Attorney, Agent, or Firm*—William N. Hogg

[57] ABSTRACT

A check-valve assembly for allowing fluid to flow from one chamber to another, but check reverse flow. The assembly includes a flapper valve, made of elastomeric material which has a sealing face which seals against sealing surfaces directed toward the high pressure chamber, and an edge extending transversely to the face which seals against a closure member.

7 Claims, 11 Drawing Figures

PATENTED JUL 2 1974 3,821,966
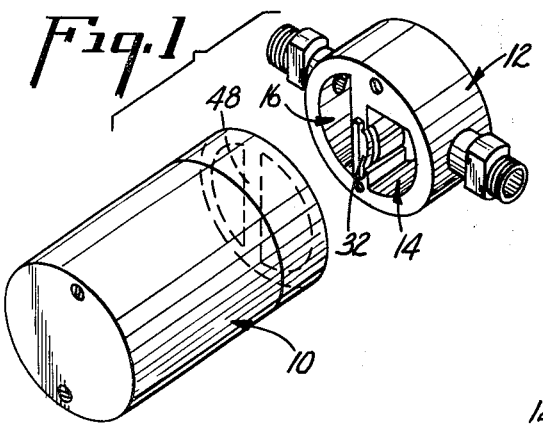
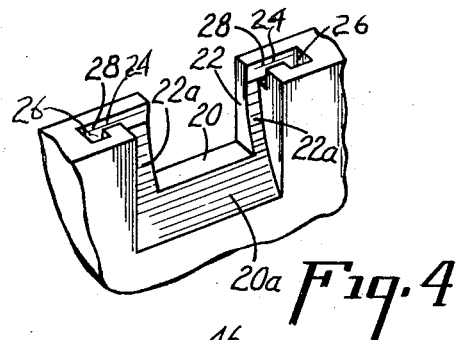
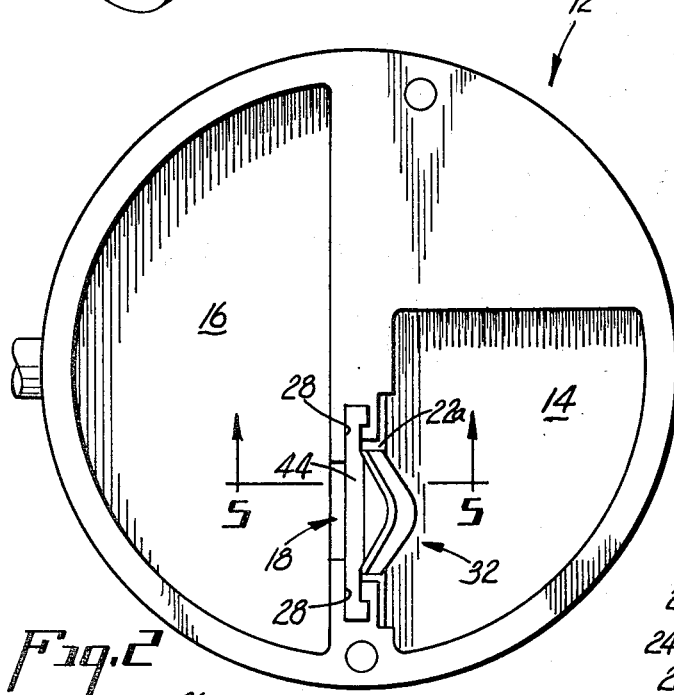
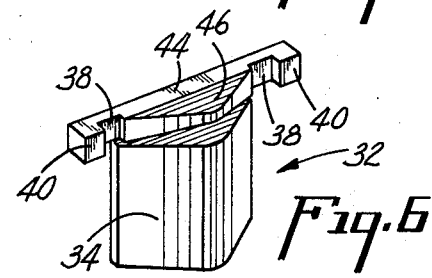
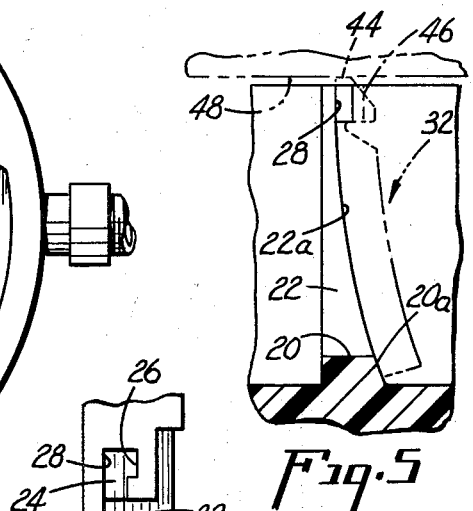
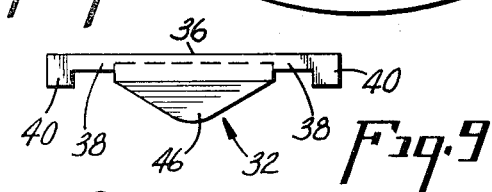
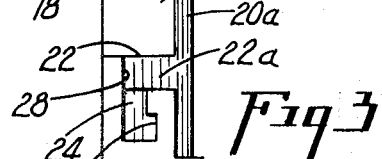
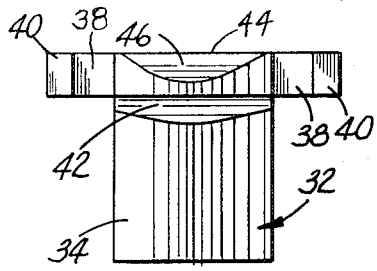
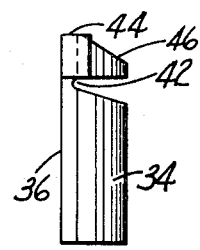
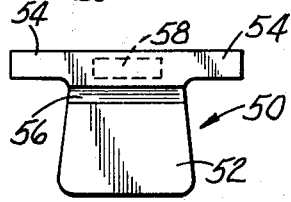
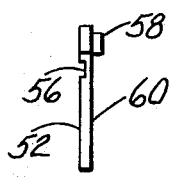

CHECK-VALVE ASSEMBLY

BACKGROUND OF THE INVENTION

This invention relates generally to unidirectional check-valve assemblies and more particularly to check-valve assemblies employing elastomeric flapper type valves for permitting fluid flow in one direction, but checking it in the opposite direction.

There have been many prior art proposals for flapper type check-valve assemblies employing elastomeric material for the flapper valve thus utilizing the inherent elastomeric properties for face to face sealing against a surface. In most instances there has been a passageway bounded by a 360° face facing the high pressure side. One edge of the flapper valve has been tightly secured against a portion of this face in engagement therewith forming a face to face seal thereagainst. This secured face then serves as a hinge about which the flapper valve can pivot with the remainder of the same face sealing against the face on the passage wall under fluid pressure.

This type of sealing by the flapper valve while quite effective in many cases, nevertheless has several disadvantages. One disadvantage is that it is somewhat expensive to provide for the necessary positive securing of the flapper valve along one face thereof, and for the labor involved in assembling a positive attachment and seal thereon during the operation of assembling the valve assembly.

Another drawback of this type of arrangement is encountered when the passage wall is not or cannot be formed with a full 360° face directed toward the high pressure chamber against which the flapper face will seal. For instance, in certain types of construction it is not feasible to form a full 360° passage face in one part but rather the passage is formed by two meeting parts. In such a case there is sealing required between the two meeting parts and not around the full 360° face; i.e., sealing is essentially an edge sealing function on one side thereof rather than a face sealing function as in the rest of the flapper valve assembly. Thus, both edge sealing and face sealing are required.

SUMMARY OF THE INVENTION

According to the present invention a unidirectional check-valve assembly is provided which employs a face sealing configuration and an edge sealing configuration for sealing functions, and which does not require permanent securing of the flapper valve in the passageway.

DESCRIPTION OF THE DRAWING

FIG. 1 is a perspective, exploded view, showing the unidirectional check-valve assembly of this invention in use in a pump-motor combination;

FIG. 2 is a plan view, in detail, of the check-valve assembly of this invention;

FIG. 3 is a detailed plan view of a portion of the device as shown in FIG. 2 with the flapper valve removed;

FIG. 4 is a perspective view of a portion of the device, with the flapper valve removed;

FIG. 5 is a sectional view taken substantially along the line 5—5 of FIG. 2 with the flapper valve shown in phantom;

FIG. 6 is a perspective view of one configuration of a flapper valve;

FIG. 7 is a front view of the flapper valve construction of FIG. 6;

FIG. 8 is a left side elevational view of the valve of FIG. 7;

FIG. 9 is a top plan view of the valve of FIG. 7;

FIG. 10 is a front elevational view of another configuration of a flapper valve construction; and FIG. 11 is a side elevation view of the flapper valve of FIG. 10.

DESCRIPTION OF THE PREFERRED EMBODIMENT

Referring now to the drawing and for the present to FIG. 1, there is shown therein a motor-pumping unit of the type that is particularly adapted to utilize the check-valve assembly of the present invention. It is to be understood that this particular environment is merely illustrative and not limiting, and is selected merely as a desirable or preferred environment for the present invention. Also, the motor-pumping unit is shown somewhat diagrammatically with the details of construction unnecessary for the understanding of the present invention omitted or slightly altered to provide a clearer presentation of the present invention. However, the basic principle is illustrated in this Figure.

In FIG. 1 the invention is shown in an environment wherein there is a motor component 10 which drives a pump impellar (not shown).

Formed as a separate piece which is assembled in end-to-end abutting relationship with the motor component 10 is a pumping chamber component designated generally as 12. The pumping chamber component 12 has formed therein a fluid discharge chamber 14 and a fluid intake chamber 16. The motor component 10 drives an impellar (not shown) which causes a pumping action of fluid from the intake chamber 16 to the discharge chamber 14. A passage 18 (FIG. 2) interconnects the discharge chamber 14 and the intake chamber 16. The passage 18 is normally closed by a check valve designated generally as 32 and operates to prevent fluid flow from the discharge chamber 14 to the intake chamber 16 when the pump is operating and producing a high pressure in the discharge chamber 14, but which will permit passage of fluid from the chamber 16 to the chamber 14 when the pump is inoperative and the pressure in the chamber 16 exceeds that in the chamber 14 to thereby provide a bypass for the pump if required when the pump is inoperative.

Referring now to FIGS. 3 and 4, the passage 18 is defined by a bottom wall 20 and a pair of side walls 22, which bottom wall 20 and side walls 22 define generally three sides of the passage 18 with the fourth side, i.e., the side directed toward the motor component 10 being open. The bottom wall 20 is bounded by a curved bottom sealing surface or face 20a, and each of the side walls is bounded by a curved side sealing surface or face 22a. Thus there is sealing surface means of less than 360° around the passage 18.

Extending laterally from the side walls 22 and adjacent the open side of the passage 18 are a pair of slots 24 having notches 26 formed at the ends thereof. The slots 24 are in part defined by end walls 28 which intersect the side sealing surfaces 22a at an angle and in such configuration that the side sealing surfaces 22a slope or curve inwardly toward the discharge chamber 14 with respect to the walls 28. This can best be seen in FIGS. 3 and 5. Preferably the side faces 22a are curved as shown in FIGS. 3 thru 5; however, they could be formed straight, the important feature being that they slope or extend in an inward direction toward the discharge chamber from the walls 28. This will allow the use of the inherent resiliency of the material of the flapper valve 32 to effect closure, as will be more fully discussed hereinafter.

In order to prevent flow from the chamber 14 to the chamber 16 when the chamber 14 has higher pressure than the chamber 16 the flapper valve 32 is disposed to block the passage 18 when the chamber 14 is at higher pressure than the chamber 16 but allow flow of fluid through the passage 18 when the chamber 16 is at higher pressure than the chamber 14. The flapper valve 32 is formed of an elastomeric material such as natural or synthetic rubber which has a characteristic resiliency which allows the material to flex to both provide its necessary hinging movement and also to provide a fluid tight seal around the two side faces 22a and bottom face 20a.

The valve 32, as illustrated in the preferred embodiment of FIGS. 1 and 2 and 6 through 9, is formed with a body portion 34 which is generally convex in shape on one side thereof with a flat sealing face 36 on the opposite side thereof.

A pair of legs 38 extend laterally from the body portion 34 and have formed at the end thereof a pair of ears 40. Preferably a reduced thickness neck portion 42 extends generally transversely of the body portion 34 adjacent where the legs 38 are connected thereto, which reduced thickness neck portion 42 provides the necessary hinging action. The valve 32 also has an upper marginal sealing surface 44 with a sloping surface 46 extending therefrom. The sealing surface 44 is adapted to coact with a sealing surface 48 on the motor component 10 (FIGS. 1 and 5) when the components 10 and 12 are assembled in abutting relationship.

The flapper valve 32 is placed into the pumping chamber component 12 when the components 10 and 12 are separate. This is accomplished by inserting the legs 38 into the sots 24 with the ears 40 extending into the notches 26. Preferably the location of the notches 26 is such that they are slightly more widely spaced than the spacing of the ears 40 on the flapper valve 32 so that there is a slight stretching of the flapper valve 32 upon insertion which will assist in providing a good flat sealing surface thereon. With the legs 38 inserted into the slots 24 the rear sealing face 36 of the flapper will rest in sealing engagement with the side faces 22a and bottom face 20a and the end walls 28 as shown in FIG. 5. Because of the curved configuration of the faces 22a and 20a and the location of the end wall 28 a certain amount of stress will be introduced into the flapper valve 32 forcing it into the curved configuration and the reaction to this stressed condition by the elastomeric material causes a positive resultant force generated by the flapper valve itself urging it into sealing engagement with side faces 22a and bottom face 20a to thus normally urge a positive sealing engagement under a balanced pressure condition; i.e., the configuration of the wall 28 and faces 20a and 22a urge a sealing engagement under neutral conditions between chambers 14 and 16.

As can be seen in FIGS. 1 and 5, the upper marginal sealing surface 44 extends above the limit of the end wall 28 to thus provide an upwardly extending elastomeric sealing band which will coact against the surface 48 when the components 10 and 12 are assembled in a tight face to face relationship. This engagement is shown in FIG. 5 showing the surface 48 being brought into sealing engagement with the upper marginal surface 44 of the flapper valve to thus insure a positive sealing engagement thereacross.

When the pressure in chamber 14 exceeds that in chamber 16, the flapper will seal against faces 20a and 22a. However, if the pressure in chamber 16 exceeds that in chamber 14, the valve will pivot with the reduced neck portion 42 acting as a hinge to allow fluid to pass from chamber 16 to chamber 14.

Thus with the configuration of the present valve assembly there is a face sealing type of engagement on three sides of a passage and an edge sealing engagement on the fourth side of the passage to thereby provide a full 360° seal around a passage even though only three sides are bounded by a face member in one component and the other side is formed open. The sealing member is so formed that it will face seal on the three sides and end seal on the fourth side against a separate component part to provide a full 360° fluid tight seal in a check-valve arrangement. The valve assembly is such that the flapper valve itself may be inserted into one of the components without any permanent bond or afixation being required. The configuration of the components and the surrounding structure and flapper valve itself allow for the valve to be easily inserted and perform effectively as a check-valve assembly without the necessity of the separate operation of providing additional securing means or the step of permanently securing the flapper valve to the component. The present invention utilizes the inherent ability of elastomeric materials to both face seal and end seal and maintain itself in a sealing configuration without any separate connecting devices.

Referring now to FIGS. 10 and 11 a slightly modified configuration of the flapper valve is shown. In the previously described embodiment the body of the flapper valve is curved convexly and this is to add additional strength to the flapper valve itself to resist rather large pressure differentials between the chambers 14 and 16 without the pressure overcoming the reaction forces of the elastomeric material to the pressure differential. Also, the ear configuration of the previously described configuration assists in preventing the legs 38 from pulling out of the slots 24 under high pressure differentials. However, where lower pressure differentials are encountered, the configuration shown in FIGS. 10 and 11 may be acceptable. In this configuration the flapper valve designated generally as 50 again is made of an elastomeric material. This is provided with a body portion 52 which is generally constant in cross-sectional configuration and has a pair of legs 54 extending therefrom. The legs 54 do not have ears on the end thereof. Preferably a reduced thickness neck portion 56 is also provided extending transversely across the body portion 52 adjacent to where the legs 54 extend therefrom. A stiffner 58, preferably in the form of a raised rectangular block, is formed to provide some stiffening of legs 54 and to resist their pullout under pressure where pressure differentials require such stiffening. The surface 60 serves as a sealing face. This configuration operates in a manner essentially the same as that shown in the previously described embodiment.

While the foregoing check-valve assembly has been described in detail, it is believed that it is comprised essentially of wall means defining passages communicating between two chambers. The wall means are partially bounded by sealing faces; slots extending laterally from the wall means. An elastomeric flapper valve is provided which has legs to insert into the slots and a body having a sealing face to seal against the sealing faces and an upper marginal edge to seal against a transversely extending component to thereby provide a full 360° fluid tight seal.

What is claimed is:

1. A unidirectional check-valve assembly which will allow fluid flow in one direction and prevent flow in the other direction comprising, first and second fluid chambers, wall means defining a passage communicating between said chambers, said wall means including slot means extending generally transversely to said passage therebeyond, said wall means being bounded by sealing surface means of less than 360° disposed to face one of said chambers, and elastomeric flapper valve means, said flapper valve means including leg means disposed to reside in said slot means and a body portion having a sealing face disposed to seal against said sealing surface means, said flapper valve having a sealing edge extending transversely to said sealing face disposed to seal against a closure member where said sealing surfaces do not surround said passage.

2. The invention as defined in claim 1 wherein said sealing surface means slant generally inwardly toward said one chamber from said slot means.

3. The invention as defined in claim 1 wherein said sealing surface means are convexly curved with respect to said one chamber.

4. The invention as defined in claim 1 wherein said body portion of said flapper valve is convexly curved.

5. The invention as defined in claim 1 wherein said flapper valve has a reduced thickness neck portion adjacent said legs.

6. The invention as defined in claim 1 wherein said slots have notches extending therefrom, and the legs of said flapper valve are provided with ears extending therefrom disposed to reside in said notches.

7. The invention as defined in claim 6 wherein said ears are disposed to place the legs of said valve in tension when residing in said notches.

* * * * *